Sept. 28, 1948.  W. H. HUNT  2,450,090
CLAMP FOR ATTACHING ARTICLES
TO THE TOP OF AUTOMOBILES
Filed Feb. 2, 1946
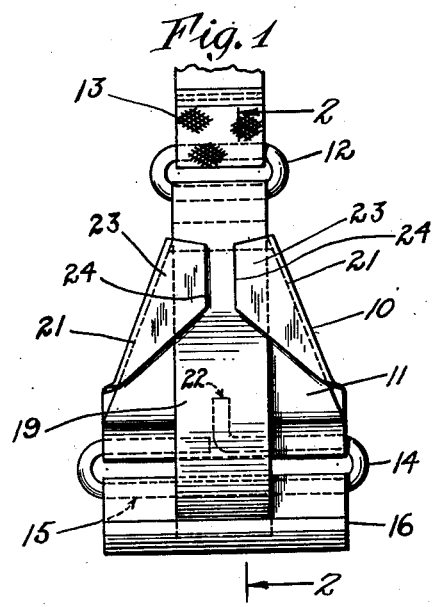
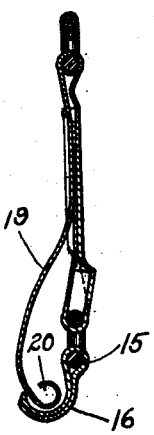
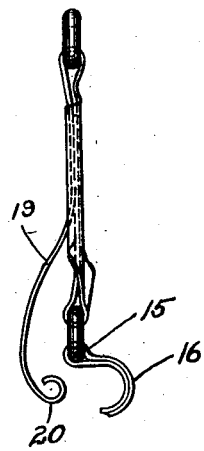
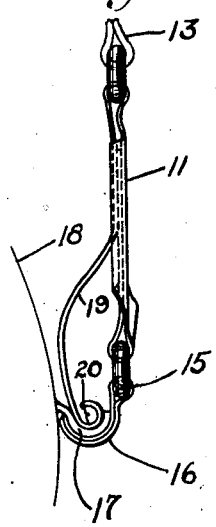
INVENTOR
William H. Hunt
BY
ATTORNEYS Patented Sept. 28, 1948

2,450,090

UNITED STATES PATENT OFFICE 2,450,090

CLAMP FOR ATTACHING ARTICLES TO THE TOPS OF AUTOMOBILES

William H. Hunt, Bridgeport, Conn.

Application February 2, 1946, Serial No. 645,182

5 Claims. (Cl. 24—243)

This invention relates to an attaching clamp for securing objects such as carriers for skis, toboggans, boats or luggage to the roof of passenger automobiles.

Carriers of the aforesaid type are generally secured to an automobile by means of straps extending down over the sides of the auto and attached to some portion of the body thereof. The current tendency to streamline automobile bodies has eliminated most projections to which attaching means for carriers can be secured. As a result, the attachment of such carriers to the body of a car often presents a relatively difficult problem.

Many current makes of automobiles have gutter troughs, ordinarily of semi-circular cross-section, secured at one edge to the body of the automobile, and extending along the sides above the doors to carry off water draining from the roof. These gutters or troughs constitute convenient points for attaching a carrier or other objects on the top of an automobile by means of straps provided with clamps for engaging the gutter troughs on opposite sides of the automobile body.

It is an object of this invention to provide a novel clamp for securing the ends of tension members, such as carrier straps, to gutter troughs of the aforesaid type, for holding an object such as a carrier in place on the top of an automobile. It is a further object of the invention to provide a clamp for the aforesaid purpose of simple and durable construction, adapted to be clamped conveniently and securely to a gutter trough, and to be readily released therefrom.

One of the features of the invention is the provision of means for increasing the clamping action of the attachment member upon application of tension thereto for holding the carrier or similar object in position on the top of an automobile.

The foregoing objects are accomplished in accordance with my invention by providing a clamp comprising a rigid body plate, tension-supporting means at one end of the plate such as a link adapted to be secured to the end of a strap, and a hook-shaped flange adapted to engage the lower surface of a gutter trough, hinged to the opposite end of the body plate. The clamp also comprises a resilient tongue extending outward from the surface of the plate intermediate its ends, and bowed inward toward the plane of the plate, its outer end extending beyond the hinge and being adapted to protrude into the hook-shaped flange when the hinge is substantially straight, so that when the flange engages the under-surface of a gutter trough, and the plate is moved about the hinge to a position in which it extends upward from the edge of the gutter, the end of the tongue engages the inner surface of the gutter, clamping it against the flange. When tension is applied by means of a strap or similar member to the upper end of the clamp, tending to draw the plate inward toward the roof, the end of the tongue is forced more tightly against the inside of the gutter, and thus increases the clamping action of the attachment device of this invention. When the plate is pulled inward toward the surface of the automobile so that the bowed surface of the tongue engages the automobile surface, additional pressure is applied to the tongue, tending to straighten the bowed portion thereof and thus forcing the end of the tongue even more firmly against the gutter. The clamp is also adapted, without application of tension to maintain itself inself in engagement with the gutter trough by reason of the fact that the end of the tongue by extending past the hinge, must flex inward toward the hinge to move past the edge of the flange, so that the flange and tongue have a yieldable detent action for release, and are yieldably held thereby in engagement with a gutter trough.

The invention will be more clearly understood from the following description of a specific embodiment of the invention, taken with the accompanying drawing wherein:

Fig. 1 is a front elevation of a clamp in accordance with this invention.

Fig. 2 is a vertical section along the line 2—2 in Fig. 1.

Fig. 3 is a side elevation of the clamp in released position.

Fig. 4 is a side elevation of the clamp installed on the gutter trough of an automobile.

As shown in the drawing, the clamp constructed in accordance with my invention, comprises a body 10, including a plate portion 11 having a link 12 at its upper end for attachment thereto of a tension member, such as strap 13, for holding an object such as a carrier on the top of an automobile. At its opposite end, the body 10 comprises a link 14, rigidly attached thereto, the outer side 15 of said link being straight and substantially parallel to the adjacent end of plate 11. A hook-shaped flange 16 is attached to the side 15 of link 14, and pivots about the side 15, so that the latter constitutes a hinge. The flange 16 is adapted as shown in Fig. 4 to engage the underside of a gutter trough 17 running along the upper edge of the side of an automobile body 18.

A resilient tongue 19 extends outward from a point on plate 11 intermediate its ends, on the same side as the outer edge of hook-shaped flange 16, said tongue extending past the hinge 15 and being bowed inward toward the plane of the plate, its outer end 20 being shaped to engage the inner surface of the gutter trough 17, and extending into the hook-shaped flange when the hinge 15 is substantially straight, so that the end 20 of the tongue and the flange 16 clamp the gutter 17 between them with the plate 11 extending upward from the outer edge of the gutter.

In the preferred form of the invention as shown in Fig. 2, when the end of the tongue 19 is inserted in flange 16, the end of the tongue is further from the axis of hinge 15 than the outer edge of flange 16, so that in order to move the flange to released position about the hinge, as shown in Fig. 3, the tongue 19 must flex inward toward the hinge, thus providing a resilient detent engagement between the flange and tongue.

In order to install the clamp of this invention on the gutter of an automobile, the hook-shaped flange 16 is bent backward about the hinge 15 to the position shown in Fig. 3 in which the end 20 of tongue 19 is released from the flange 16. The latter is then positioned against the lower surface of the gutter trough 17, and the plate 11 together with tongue 19 is bent upward to the position shown in Fig. 4, wherein the end 20 of tongue 19 engages the inner surface of the trough 17. The clamp is adapted in this position to maintain its engagement with the trough by reason of the aforesaid detent action of the tongue 19, the tongue is resiliently deformed, so that in tending to return to its normal shape shown in Fig. 3, it urges the plate 11 upward and thus pulls the hook-shaped flange 16 into engagement with the lower surface of the gutter 17. When tension is applied to the strap 13, tending to pull the plate 11 inward toward the surface 18 of the automobile, the tongue 19 is further deformed increasing the clamping effect of its end 20 and the hook-shaped flange 16 on gutter trough 17; and if sufficient tension is applied to draw the surface of the tongue 19 into contact with the surface 18 of the automobile, pressure existing between these two surfaces increases the pressure at the end of the tongue 19 against the gutter by tending to straighten the bowed portion of the tongue.

For releasing the clamp it is merely necessary to bend the plate 11 backward about hinge 15 to the position shown in Fig. 3, and then unhook the flange 16 from the lower side of the gutter 17.

The clamp in accordance with this invention thus provides means for attaching a tension member for holding objects on the top of an automobile which exerts positive clamping action, regardless of tension applied thereto, upon the gutter of the automobile to hold the clamp in position thereon, said clamping action being increased when tension is applied tending to draw the attachment member inward toward the surface of an automobile.

Advantageously, the clamp is constructed in accordance with the invention by forming the plate 11 and tongue 19 from a single piece of sheet metal. For this purpose a blank of sheet metal is formed with a relatively wide rectangular body-forming portion, and a relatively narrow tongue-forming strip extending outward from one end thereof. At its opposite end, the rectangular portion has its corners cut off along diagonal lines 21. The hinge link 14 is advantageously constructed of metal rod or heavy wire, bent into an elongated loop, with one end projecting outward in the plane of the loop, at one side thereof, to form a lug 22. The wide body-forming portion of the blank is inserted in hinge link 14, and the end of the blank having diagonally cut corners is folded upward over the side of the link from which lug 22 projects, as shown in Fig. 1. The folded layers of metal are pressed together, enclosing the inner side of the link 14 including lug 22, and clamping same between the layers, so that the link 14 constitutes a rigid extension of the folded end of the plate 11.

The strap-holding link 12 is passed over the tongue-forming strip of the blank, and the latter is folded downward over one side of the strap link, against the surface of the upwardly turned opposite end of the plate-forming portion. Preferably the end of the tongue-forming strip is preformed to the desired bowed shape of tongue 19, with its end 20 curled inwardly (as shown in Figs. 2 to 4, inclusive). In order to hold the tongue-forming strip against the surface of the plate the corners 23 of the rectangular portions of the blank are bent inward over the diagonal edges 21, so as to overlie the upper portion of the tongue-forming strip for holding it against the surface of plate 11. The tips of the corners may be cut away as shown at 24, if necessary, to avoid their overlapping at the center of the clamp.

The hook-shaped flange 16 is advantageously formed of a piece of sheet metal, folded over the outer side 15 of link 14. Preferably, the two folded sides of the flange 16 are substantially coextensive so as to provide a rigid construction, as shown in the drawing.

It will be seen that the foregoing construction provides a particularly economical form of clamp which can be readily constructed by a minimum number of operations from simple pieces of sheet metal and metal rod bent into required shapes.

Variations and modifications may be made with the scope of this invention and portions of the improvements may be used without others.

I claim:

1. A clamp for attachment to a gutter trough of an automobile, comprising a rigid plate with tension-supporting attachment means at one end thereof, a hook-shaped flange hinged to the opposite end of the plate to project entirely beyond the end of the plate and shaped to engage the under-surface of a gutter trough, and a resilient tongue connected to and extending diagonally outward from the plate intermediate its ends, and bowed inward toward the plate, said tongue extending past the hinge and into said hook-shaped flange when the hinge is substantially straight and the hook-shaped flange is disposed beyond the end of the plate so as to clamp the gutter trough between the end of the tongue and the flange when the plate extends upward from the edge of the gutter trough.

2. A clamp for attachment to a gutter trough of an automobile, comprising a rigid plate with tension-supporting means at one end thereof, a hook-shaped flange hinged to the opposite end of the plate to project entirely beyond the end of the plate and shaped to engage the undersurface of said gutter trough, and a resilient tongue connected to and extending diagonally outward from one surface of said plate intermediate its ends past the hinge, the end of said tongue terminating adjacent the hinge and being shaped to engage the upper surface of said gutter trough, said tongue being bowed inward toward the plate and responding to lateral pressure on the bowed portion thereof to increase the clamping action of said tongue and flange on the gutter trough.

3. A clamp for attachment to a gutter trough of an automobile, comprising a sheet metal plate having a relatively narrowed tongue integral therewith at one end and folded over to extend beyond the opposite end of the plate, the corners of the plate adjacent the fold of said tongue being folded inward to hold a portion of said tongue against the surface of the plate, an attachment link secured in the fold of said tongue for connection to a supporting device, a hinge link having a lateral projection enclosed in a fold at the opposite end of said plate, and a hook-shaped flange hinged to the opposite side of said hinge link, said tongue extending past the hinge and having the lower portion thereof bowed inward toward said plate, said hook-shaped flange being shaped to engage the lower surface of a gutter trough, and the end of said tongue being shaped to engage the upper surface of said trough when the hinge is substantially straight and the plate extends upward from the outer edge of the gutter trough.

4. A clamp for attachment to a gutter trough of an automobile, comprising a rigid body, a hook-shaped flange hinged to said body to project entirely beyond the end of the body for engaging the lower surface of said gutter trough, and a projection on said body intermediate the ends and extending beyond the end of the body and having an end adjacent the hinge cooperating with the hook-shaped flange to clamp the gutter trough between them in one position of the hinge, and to release said gutter trough on movement of the flange about the hinge away from said projection, tension applied to said body tending to move the body about the hinge in the opposite direction, so as to increase the clamping action on the gutter trough.

5. A clamp for attachment to a gutter trough of an automobile comprising a rigid plate with tension-supporting means at one end thereof, a hook-shaped flange hinged to the opposite end of said plate to project entirely beyond the end of the body and shaped to engage the lower surface of said gutter trough, and a resilient tongue extending from a point on one surface of the plate past the hinge, said tongue being bowed inward toward said plate and the free end of the tongue being disposed adjacent the hinge and having a bead to engage the upper surface of said gutter trough with the plate extending upward from the outer edge of said trough, said tongue and flange resiliently clamping the gutter trough between them and responding to tension applied to the opposite end of said plate to increase the clamping action of the tongue and flange on the gutter trough.

WILLIAM H. HUNT.

REFERENCES CITED

The following references are of record in the file of this patent:

UNITED STATES PATENTS

| Number | Name | Date |
| --- | --- | --- |
| 537,955 | Adams | Apr. 23, 1895 |
| 641,544 | Richards | Jan. 16, 1900 |
| 2,098,821 | Cook | Nov. 9, 1937 |